UNITED STATES PATENT OFFICE.

HENRY H. BEACH, OF ROME, NEW YORK.

IMPROVEMENT IN FEED FOR HORSES AND CATTLE.

Specification forming part of Letters Patent No. 174,346, dated March 7, 1876; application filed July 3, 1875.

*To all whom it may concern:*

Be it known that I, HENRY H. BEACH, of Rome, Oneida county, in the State of New York, have invented an Improved Feed made from Indian Corn, of which the following is a specification:

My invention relates to feed for horses and cattle made from Indian corn, as a new manufacture; and consists of ground cooked corn having the peculiar qualities and characteristics hereinafter described.

The distinguishing qualities possessed by my new feed will be more readily and fully apprehended and understood by first noticing the process or method by which it may be produced, which is as follows:

A properly-constructed reservoir or vat is provided, in which the Indian corn intended to be converted into feed is subjected to the action of hot vapor—preferably at a temperature not less than 212° Fahrenheit—steam under considerable pressure, by a pipe leading from a steam-generator into several perforated branches arranged within the vat, whereby the vapor is diffused through the mass of corn. It is thereby quickly heated to the temperature of the vapor, which should be as near 212° as possible. The corn is then allowed to stand in this moist heat from twenty-five to thirty minutes, during which time the water or free moisture that is in the corn is being converted into vapor, and escaping from the envelopes of the kernels, and a portion of their starch is being converted into sugar. After this operation of steaming is completed, which, as I have before said, will occupy some twenty-five to thirty minutes, the corn, while still hot, is transferred to a suitable mill and ground, preferably not into fine meal, but into coarse feed.

This feed, thus manufactured, differs in intrinsic qualities from any heretofore made. Having been subjected to a high degree of heat in vapor it is practically cooked. All the chemical changes (one of which of much importance is the conversion of some of its starch into sugar) having been wrought upon it, its vitality having been destroyed, and its natural moisture having been converted into vapor, and thereby, in great measure, expelled, it quickly dries after it leaves the mill, and, therefore, is not liable readily to sour. It is sweeter, more easily masticated, more palatable and wholesome, and more nutritious than feed made from uncooked or unheated corn. It also differs from common feed in the form and consistency of its particles, and, therefore, is plainly distinguishable therefrom by the eye, as well as by the sense of touch.

The common feed made from hard, raw, unsoftened corn, whether coarsely or finely ground, is composed of hard, sharp angular particles, particularly those formed of the outer folds of the kernels, and have a hard, sharp, gritty feeling when rubbed between the fingers.

My new feed, on the contrary, is composed of particles that are more or less flattened or flaky, and are soft and yielding to the touch.

I repeat that the special advantages which this new corn-feed possesses over any other are, first, it is more easily masticated; second, it is more palatable; third, it is more digestible and nutritious; and, fourth, it is less liable to sour or deteriorate in quality by lapse of time or exposure to climatic or atmospheric agencies.

I am, of course, aware that common corn feed has been cooked by boiling in water, by steaming, and, perhaps, in other ways; but ground feed cooked in moist heat, whether water or vapor, makes "mush" merely. If cooked by any heat it is merely parched. In either case the product is totally different from my feed, and I do not claim either. So, also, boiled and steamed corn is common. But I am not aware that either boiled or steamed corn has ever been ground while hot and moist. Nor am I aware that it would be practical to grind boiled corn at all without first drying it, when the product, as I know by experiment, differs intrinsically and perceptibly from my feed. Boiled corn dried tastes somewhat like, and in other respects resembles, parched corn, and the feed made from it is hard, angular, gritty, and, comparatively, indigestible, and has the taste of parched corn.

I have herein described a process or method by which my new feed may be manufactured, which process, being new itself, I regard as patentable; but I do not here claim the same, reserving it for a separate application and patent. While I do not propose to be confined to the process described, still I am compelled to say that I know of no other—namely, that of steaming the corn, as specified, and then grinding it while still hot and moist—by which my new feed can be produced.

I claim as my invention—

As a new manufacture, the feed for horses made from Indian corn, as described, the same being distinguishable from common corn-feed by being more flaky in appearance, softer, less angular to the sense of touch, and sweeter, as specified.

In witness whereof I have hereunto set my hand this 1st day of July, 1875.

HENRY H. BEACH.

Witnesses:
W. H. SMITH,
A. S. FITCH.